US009578888B2

United States Patent
Seibold et al.

(10) Patent No.: US 9,578,888 B2
(45) Date of Patent: *Feb. 28, 2017

(54) LOW DENSITY FROSTINGS AND METHODS

(71) Applicant: General Mills, Inc., Minneapolis, MN (US)

(72) Inventors: Jon Duke Seibold, Mahtomedi, MN (US); Melissa Miller, Minneapolis, MN (US); Mike Duellman, Champlin, MN (US)

(73) Assignee: General Mills, Inc., Minneapolis, MN (US)

( * ) Notice: Subject to any disclaimer, the term of this patent is extended or adjusted under 35 U.S.C. 154(b) by 13 days.

This patent is subject to a terminal disclaimer.

(21) Appl. No.: 14/508,439

(22) Filed: Oct. 7, 2014

(65) Prior Publication Data

US 2015/0223487 A1 Aug. 13, 2015

Related U.S. Application Data

(63) Continuation of application No. 14/191,854, filed on Feb. 27, 2014, which is a continuation of application No. PCT/US2014/015368, filed on Feb. 7, 2014.

(51) Int. Cl.
*A23G 3/40* (2006.01)
*A23G 3/34* (2006.01)

(52) U.S. Cl.
CPC ............... *A23G 3/343* (2013.01); *A23G 3/40* (2013.01); *A23V 2002/00* (2013.01)

(58) Field of Classification Search
USPC ........................................................ 426/572
See application file for complete search history.

(56) References Cited

U.S. PATENT DOCUMENTS

| | | | |
|---|---|---|---|
| RE21,406 E | 3/1940 | Vogt | |
| 2,801,177 A | 7/1957 | Lutton | |
| 3,253,928 A | 5/1966 | Bedenk et al. | |
| 4,622,233 A | 11/1986 | Torres | |
| 5,102,680 A * | 4/1992 | Glass et al. | 426/572 |
| 5,439,697 A * | 8/1995 | Gonzalez-Sanz | 426/572 |
| 5,529,800 A | 6/1996 | Bourns et al. | |
| 6,203,841 B1 | 3/2001 | Lynch et al. | |
| 7,871,656 B2 | 1/2011 | De Muijnck | |
| 2008/0199590 A1 | 8/2008 | Kincs et al. | |
| 2009/0214741 A1 | 8/2009 | Atapattu et al. | |

(Continued)

FOREIGN PATENT DOCUMENTS

| | | |
|---|---|---|
| EP | 0 743 824 | 5/2002 |
| GB | 2 297 892 | 8/1996 |

(Continued)

OTHER PUBLICATIONS

Dos Santos, et al. "Solid Fat Content of vegetable oils and simulation of interesterification reaction: Predictions from thermodynamic approach". Journal of Food Engineering, 126 (2014): 198-205.*

(Continued)

*Primary Examiner* — Jenna A Watts
(74) *Attorney, Agent, or Firm* — Rachel A. Kahler; Diederiks & Whitelaw, PLC

(57) ABSTRACT

The invention relates to low density ready-to-spread frosting compositions and related methods.

24 Claims, 4 Drawing Sheets

(56) References Cited

U.S. PATENT DOCUMENTS

| 2011/0177227 A1 | 7/2011 | Cruz Serna et al. |
| 2011/0281015 A1 | 11/2011 | Higgins et al. |
| 2014/0272081 A1 | 9/2014 | Volker et al. |

FOREIGN PATENT DOCUMENTS

| WO | WO 95/21535 | 8/1995 |
| WO | WO 02/19840 | 3/2001 |
| WO | WO 2005/006887 | 1/2005 |
| WO | WO 2006/048644 | 5/2006 |

OTHER PUBLICATIONS

De Oliveira, et al. "Effect of the addition of hardfats on technological properties of palm oil: solid fat content, consistency and crystallization kinetic". Presented on May 24, 2011 as a published poster and paper at 11th International Congress on Engineering and Food, May 22-26, 2011, Athens, Greece. pp. 1-9.*

Idris, et al. "Interesterified palm products as alternatives to hydrogenation". Asia Pac J Clin Nutr 2005; 14(4): 396-401.*

Gorton, Laurie. "Bakery Shortenings find the performance zone". Available online as of Oct. 1, 2012 from www.bakingbusiness.com. pp. 1-5.*

* cited by examiner

LOW DENSITY FROSTINGS AND METHODS

RELATED APPLICATIONS

This application is a continuation of U.S. Ser. No. 14/191,854, filed Feb. 27, 2014, which is a continuation of International No. PCT/US2014/015368, filed on Feb. 7, 2014, entitled "LOW DENSITY FROSTINGS AND METHODS," which applications are herein incorporated by reference in their entireties.

FIELD OF THE INVENTION

The invention relates to low density frosting compositions and related methods, preferred compositions being low in trans fats and containing non-hydrogenated palm-oil based fat.

BACKGROUND

"Icing" and "frosting" are terms conventionally used to identify spreadable, semi-solid confectionery products that are applied as toppings to sweeten and decorate baked goods such as cakes, breads, cookies, and the like. Generally, icings and frostings can be categorized into several basic types depending in part on whether a particular product contains fat (generally shortening) or not, and whether or not the product is aerated. Types include royal icings, fluffy frostings, cream icings, and aerated creamy frostings. The presence of a fat affects the emulsion characteristics of an icing or frosting. "Icing" is sometimes used to refer to an unaerated composition, while "frosting" tends to refer to an aerated product.

Within this broad category of sweetened spreadable toppings or fillings are ready-to-spread ("RTS") frostings, which, as the name indicates, are fully prepared frostings that can be spread onto a food product without the need for preparation steps by a consumer-purchaser. RTS frostings are a popular consumer food product due to the convenience of being fully prepared. RTS frostings presented for sale in a fully prepared and optionally aerated state. They can be packaged and stored unopened at room temperature for extended times (a one year shelf life target is typical), or stored after opening at refrigerator temperatures for relatively shorter times. RTS frostings can be applied directly out of a product container to a cake or other baked good without mixing or any other preparation step. RTS frostings are thus formulated so as to be usable without the addition of ingredients or other further preparation steps by the consumer.

Desired organoleptic and performance properties for RTS frostings include a smooth texture, desired consistency, spreadability without flowing or running, resistance to syneresis or weeping of the frosting in an unopened container, resistance to syneresis or weeping between cake layers upon overnight storage, and stability. A density suitable for a low-density, whipped RTS frosting can be from about 0.75 to about 0.95 grams per cubic centimeter. For these low density products, stability requires good resistance to air cell collapse or coalescence upon extended shelf storage or during stirring or other use by a consumer.

Fat-containing RTS frostings, as is typical with many fat-containing prepared food products, are likely or certain to contain a hydrogenated fat ingredient, and, therefore, to include trans fats. "Trans" fats are isomers of naturally occurring unsaturated fatty acids that are typically created during hydrogenation processes of many fat ingredients of frostings, including previous RTS and low density RTS frostings. Partially and fully-hydrogenated fats have been used in processed foods for many years, meaning that many commercial processed food product formulations contain trans fats. Recently trans fats have become disfavored. There is a current strong interest for fat compositions that can be useful substitutes for trans-containing hydrogenated fats in commercial food product formulations, i.e., useful fat ingredients that contain low levels of trans fats or are free of trans fats.

While a strong interest lies in removing trans fats from food products, including RTS frostings and low density RTS frostings, the challenge of re-formulating previous commercial products to avoid trans fats is daunting, especially if consumer expectations are already in place, which is true for low density RTS frostings. The food industry would expect high demand for a low density frosting that includes a low or a very low amount of trans fats, e.g., zero trans fats, but such a product would be less successful if the change in frosting ingredients or processing necessary to reduce the level of trans fats caused changes to the product that would upset consumer's expectations relative to past products.

Thus, although the use of low trans fat in food products is a general goal, replacing a fat ingredient of a food product such as a low-density RTS frosting, which is well established with a consuming public, is an imposing challenge. Replacing any ingredient of an established commercial food product must be done in a manner that does not have an overwhelming affect on taste and non-taste properties of the product. In the case of low density frosting, these challenges are at least as great as with other consumer food products due to consumer expectations that a low density frosting exhibit desired flavor, density, texture, appearance, and stability.

SUMMARY

The invention relates to low density frostings that can be sold commercially, that exhibit useful and desirable organoleptic and stability properties. The low density frostings can be prepared commercially to include desirable or highly desirable taste, texture, mouthfeel, appearance, viscosity, spreadability, and storage stability properties.

The low density frostings are prepared to contain fat ingredients that have a low trans fat content, yet still allow processing by aeration to form a low density frosting, preferably one that is stable over extended storage of weeks or months at a low density. Fat of the frosting can include two separate components. A first fat component is non-hydrogenated low trans fat-containing palm oil-based shortening. The second fat component is a crystal-enhancing fat component such as a room temperature solid fully-hydrogenated fat ingredient or a room temperature solid partially-hydrogenated fat ingredient.

Non-hydrogenated low trans fat-containing palm oil-based shortening materials have been found to be not useful when included alone as a fat ingredient (combined with other frosting ingredients) of an aerated low density frosting formulation. The non-hydrogenated palm oil-based shortenings, when combined with other frosting ingredients such as sugar, water, emulsifier, etc., have been found to not possess the physical properties necessary to form and maintain a low density aerated frosting structure. When these non-hydrogenated palm oil-based shortening materials are combined with the other frosting ingredients and processed to produce aeration, the result is typically a non-aerated liquid that does not exhibit a low density or other properties of a low density whipped aerated frosting.

According to the present description, Applicant has identified that low trans fat-containing non-hydrogenated palm oil-based shortening materials can be made to form an aerated low density frosting by combining the non-hydrogenated palm oil-based shortening with another, harder fat ingredient, referred to as a crystal-enhancing fat component. The combined fat ingredients can be aerated to form a low density frosting, even where the non-hydrogenated palm oil-based shortening cannot. The combined fat ingredients have also been found to exhibit a rate of crystallization that is faster than a rate of crystallization of the non-hydrogenated palm oil-based shortening alone. Example embodiments of the low density frosting are sufficiently stable to pass the "Stir-Down test" described herein.

In one aspect, the invention relates to a low density frosting that includes: from 50 to 85 weight percent sweetening agent based on total weight frosting; from 15 to 30 weight percent total fat ingredients based on total weight frosting, the total fat ingredients include a) a major amount of non-hydrogenated palm oil-based shortening ingredient, and b) up to about 25 weight percent crystal-enhancing fat ingredient, based on weight total fat ingredients; and from 10 to 20 weight percent water based on total weight frosting. The frosting has a density in a range from 0.75 to 0.95 grams per cubic centimeter.

In another aspect the invention relates to a low density frosting that includes: from 50 to 85 weight percent sweetening agent based on total weight frosting; from 15 to 30 weight percent total fat ingredients based on total weight frosting, the total fat ingredients comprising a major amount of non-hydrogenated palm oil-based shortening ingredient; and from 10 to 20 weight percent water based on total weight frosting. The frosting has a density in a range from 0.75 to 0.95 grams per cubic centimeter. The total fat ingredients exhibit a rate of crystallization profile having a percent solid fat measurement of at least 20 percent at 2.5 minutes.

In another aspect the invention relates to a low density frosting that includes: from 50 to 85 weight percent sweetening agent based on total weight frosting; from 15 to 30 weight percent total fat ingredients based on total weight frosting, the total fat ingredients comprising: a) a major amount of non-hydrogenated palm oil-based shortening ingredient, and b) up to about 25 weight percent room temperature solid partially-hydrogenated fat, based on weight total fat ingredients in the frosting; and from 10 to 20 weight percent water based on total weight frosting. The frosting has a density in a range from 0.75 to 0.95 grams per cubic centimeter.

In yet another aspect the invention relates to a low density frosting that includes: from 50 to 85 weight percent sweetening agent based on total weight frosting; from 15 to 30 weight percent total fat ingredients based on total weight frosting, the total fat ingredients comprising at least 90 weight percent of a blend of non-hydrogenated palm oil-based shortening ingredient and room temperature solid partially-hydrogenated fat; and from 10 to 20 weight percent water based on total weight frosting. The frosting has a density in a range from 0.75 to 0.95 grams per cubic centimeter. The total fat ingredients exhibit a rate of crystallization profile having a percent solid fat measurement of at least 20 percent at 2.5 minutes.

In another aspect the invention relates to a fat composition that includes: a major amount of non-hydrogenated palm oil-based shortening ingredient, and up to about 25 weight percent room temperature solid crystal-enhancing fat ingredient, based on total weight fat composition. The fat composition exhibits a rate of crystallization profile having a percent solid fat measurement of at least 20 percent at 2.5 minutes.

In another aspect the invention relates to a fat composition that includes: a major amount of non-hydrogenated palm oil-based shortening ingredient; and up to about 25 weight percent room temperature solid partially-hydrogenated fat, based on weight total fat composition. The fat composition exhibits a rate of crystallization profile having a percent solid fat measurement of at least 20 percent at 2.5 minutes.

In yet another aspect the invention relates to a method for making a low density frosting. The method includes combining frosting ingredients that include: from 50 to 85 weight percent sweetening agent based on total weight frosting; from 15 to 30 weight percent total fat ingredients based on total weight frosting, the total fat ingredients comprising: a) a major amount of non-hydrogenated palm oil-based shortening ingredient, and b) up to about 25 weight percent crystal-enhancing fat ingredient, based on weight total fat ingredients; and from 10 to 20 weight percent water based on total weight frosting. The combined frosting ingredients are homogenized to form a homogenized frosting base having a density of about 1.1 to 1.3 grams per cubic centimeter. The homogenized ingredients are cooled to a temperature of from about 60 to about 70 F within a residence time of about 2 to 30 seconds to form a cooled frosting base. The cooled frosting base is mixed with inert. The gas and cooled frosting base is aerated while cooling to form a low density frosting having a density of about 0.75 to 0.95 grams per cubic centimeter.

Throughout the specification and claims all percentages used herein are in weight percentages and are based on the total weight of the low density frosting composition, unless otherwise indicated.

DETAILED DESCRIPTION

Figure 1:
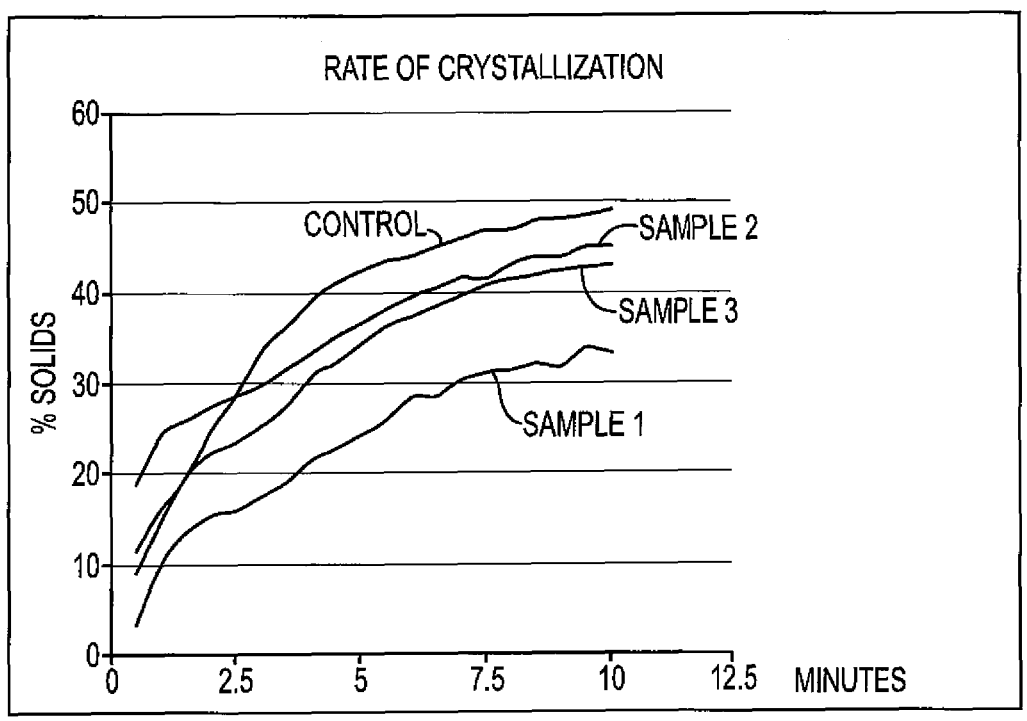
FIGS. 1, 2, and 3 show Rate of Crystallization information for fat samples.

The following description relates to low density frostings made of ingredients that include a low-trans fat non-hydrogenated palm oil-based shortening, a crystallization-enhancing fat ingredient, sugar, water, and other ingredients generally at low or minor amounts.

The frostings have a low density, meaning that they are aerated and have a density that is below 0.95, 0.94, preferably below about 0.9 or below about 0.87 cubic centimeters per gram. Preferred low density frostings also have a stable structure of air bubbles supported by a matrix, the matrix being made of the frosting materials (fat, sugar, etc.) and being sufficiently stable that the low density frosting can be prepared, stored, transported, and presented for commercial sale while maintaining a low density. Upon use by a consumer, the density of preferred frosting embodiments does not unduly increase, such as upon a consumer opening a package of the frosting and stirring the frosting within the package. (See the Stir-Down Test described herein.)

Embodiments of the described low density frostings can exhibit other useful frosting properties such as flavor, texture, mouthfeel (e.g., non-waxy feel), viscosity, and spreadability properties that allow for sale as a consumer frosting product. Preferably, a low density frosting as described can contain a low amount of trans fat, such as less than 2, 1, 0.5, 0.4, 0.2, or less than 0.1 weight percent trans fat based on a total weight frosting.

Exemplary low density frostings can have any useful water activity. Water activity is a measure of the amount of chemically available water in a frosting, i.e., water that is not bound, or "free." A lower water activity of a frosting means that the frosting has a lower amount of free water in a frosting, which reduces the propensity for the frosting to dry out and harden. Also, a lower water activity of a frosting improves the ability of the frosting to contain solid particulates such as chocolate chips, without degrading the particulates. And a lower water activity reduces the potential for microbial growth in a frosting, which allows for reduction or elimination of preservatives. Without limiting the present disclosure or claims, examples of water activity of the described low density frostings can be in a range from about 0.7 to about 0.85, e.g., from about 0.75 to about 0.82.

A described low density frosting can include a total amount of fat ingredients, referred to as "total fat ingredients" of the frosting, a substantial portion of which is non-hydrogenated palm oil-based shortening ingredient (or "palm oil-based shortening" for short). Another portion of the total fat ingredients is crystal-enhancing fat ingredient, which is a fat ingredient that is (among other things) solid at room temperature, e.g., up to about 20 or 25 weight percent based on the weight of total fat ingredients of the frosting. As used herein the term "total fat ingredients" refers only to ingredients understood to be fat or oil ingredients, generally meaning ingredients that have a high or very high level of tri-glycerides; the term does not refer to other ingredients that include concentrated levels non-tri-glyceride fatty acids or fatty acid residues such as ingredients that include a high concentration of mono-glycerides or diglycerides, especially such ingredients that are known as emulsifiers or dispersants.

Various palm oil-based shortenings are known. They have been identified as having taste and organoleptic properties desired in a frosting, e.g., have been found to exhibit desired performance in terms of taste, mouthfeel, or texture, when combined with other ingredients to produce a frosting. They also provide a low trans fatty acid nutritional profile. But these fat ingredients if used alone as the sole fat ingredient in a frosting do not exhibit processing properties that allow them to be processed by aeration, with other frosting ingredients, into a low density frosting. The present Applicant has now identified that when a minor amount of crystal-enhancing fat ingredient is combined with the palm oil-based shortening, the blend of these two fat materials can function as total fat ingredients of a frosting that are capable of being processed with other frosting ingredients into an aerated low density frosting, preferably one that is stable as specified in the Stir-Down Test described herein.

The palm oil-based shortening is non-hydrogenated, meaning that it does not substantially contain fat material that has been processed by a method of hydrogenation. Hydrogenation is a known method used to increase a level of saturation of a fat material, and that also is known to produce trans fatty acid in the fat material. The palm oil-based shortening used in a frosting as described herein is made substantially of one or a combination of fat ingredients that are not hydrogenated, meaning not partially-hydrogenated and not fully-hydrogenated. For example, the palm oil-based shortening can contain at least 90, 95, 99, or 100 weight percent non-hydrogenated fat materials, especially non-hydrogenated palm-oil based fat materials. A portion of the non-hydrogenated palm oil-based shortening may optionally be fractionated or interesterified to effect desired or advantageous mechanical properties such as plasticity, melt point, etc. The palm oil-based shortening preferably excludes any substantial amount (e.g., contains less than 1 percent, less than 0.5, 0.2, or 0.1 weight percent) of hydrogenated, partially-hydrogenated, or fully-hydrogenated fat material.

The palm oil-based shortening includes a major amount of fat derived from palm oil, which is known to include high naturally occurring levels of saturated fatty acids and low levels of trans fatty acids. The palm oil-based shortening may be what is referred to as a pure oil or a whole oil (e.g., whole palm oil), e.g., the palm oil-based shortening may be entirely (e.g., 100 percent) whole palm oil. Other embodiments of the palm oil-based shortening can be a portion of whole palm oil combined with a portion of fractionated or interesterified fat (especially palm oil). Fractionated palm oils are known, and are prepared by known methods of fractionation (e.g., fractionated palm oil, fractionated palm kernel oil), using crystallization and separation processes, to obtain more solid (stearin) fractions eliminate more liquid (olein) fractions. Interesterified fats (including interesterified palm oil or palm oil fractions) are also known and can be prepared by known methods of interesterification whereby fatty acid residues of tri-glycerides are removed and re-combined, i.e., exchanged between glyceride molecules in a manner that affects one or more physical properties of the fat such as melting point or solid fat content.

Palm oil is to be distinguished from palm kernel oil. Both palm kernel oil and palm oil are obtained from the same plant, but from different parts. Palm kernel oil is obtained by expression of palm kernels. Palm oil is obtained from the husks rather than the seed nut. Palm oil is characterized by a red color resulting from a high carotene level. Also, palm oil is characterized by high levels of palmitic and oleic acids whereas palm kernel oil is a lauric oil similar to coconut oil, having little palmitic or oleic acid. Naturally occurring whole palm oil is fluid at room temperature in contrast to palm kernel oil.

Embodiments of the palm oil-based shortening can include a majority of or a high or very high level of non-hydrogenated whole palm oil. Exemplary embodiments of palm oil-based shortenings can contain at least 50 weight percent, at least 70, 80, 90, 95, 99 or more weight percent non-hydrogenated whole palm oil. Optionally, some or all of the whole palm oil may be interesterified or otherwise modified other than by hydrogenation.

Certain embodiments of palm oil-based shortenings include a blend of non-hydrogenated whole palm oil, and a non-hydrogenated stearin fraction of palm oil. Such two-part blends of whole palm oil and palm stearin may contain any useful amount of each of these two fat materials, such as from about 50 to about 95 weight percent whole palm oil and from about 5 to about 50 weight percent palm stearin fraction; from 70 to about 90 weight percent whole palm oil and from about 10 to about 30 weight percent palm stearin fraction; or from about 75 or 80 to about 90 weight percent whole palm oil and from about 10 to about 20 or 25 weight percent palm stearin fraction. Optionally, some or all of the whole palm oil or the palm stearin, or both, may be interesterified or otherwise modified, except by hydrogenation.

While not necessarily preferred, a palm oil-based shortening used in a frosting as described may also contain a low or minor amount of non-palm oil-based fat or other non-fat ingredients. Examples of non-palm oil-based fat ingredients include known non-palm oil fats and their derivatives (e.g., fractionated, hydrogenated, modified), including non-tropical and tropical fats. Examples include oils obtained from soybean, rapeseed (canola), sunflower, peanut, hazelnut, walnut, cottonseed, olive, corn, grapeseed, rice bran, sesame, safflower, linseed/flax, oat, wheat germ, copra oil, cottonseed oil, palm kernel oil, coconut oil, rice bran oil, palm kernel oil (e.g., fractionated palm kernel oil), and the like. Certain more specific examples include low linolenic soybean oil, high oleic canola oil, and high oleic soybean oil. Others include triglyceride oils that are derived from microorganisms, animals (e.g., lard, tallow, butter), and plants. These may optionally be natural, processed by interesterification, hydrogenation, or fractionation, genetically modified, or trait enhanced.

A non-palm oil-based fat or non-fat ingredient may be present in a palm oil-based shortening ingredient in an amount that does not substantially deteriorate from important properties of the palm oil-based shortening or the finished low density frosting, such as taste, mouthfeel, texture, viscosity, Rate of Crystallization, spreadability, processability to a low density form, and stability. A preferred amount of such non-palm oil-based fat or non-fat ingredient may be an amount that does not exceed about 10, 5, 2, or 1 weight percent of the palm oil-based shortening. Most preferably, the palm oil-based shortening can contain less than 1 or less than 0.5 weigh percent of such non palm oil-based fat or non-fat ingredient.

A palm oil-based shortening may optionally and preferably be plastic, or capable of being formed into a plastic, e.g., by a known method such as votation. As used herein, the term "plastic" in reference to a palm oil-based shortening means a solid, non-fluid, non-pourable and non-pumpable shortening (fat) at room temperature of 70 degrees F. (21 degrees C.).

The palm oil-based shortening can also be characterized as exhibiting one or more of other various mechanical traits found to be useful for preparing the described frosting. One well-known trait for characterizing a fat composition is Solid Fat Content (SFC). SFC is determined for a fat sample by detecting the NMR signal from both liquid and solid components in the fat sample, or by detecting the change in the liquid signal as it is displaced by solid. AOCS methods for determining SFC include AOCS Cd 16b-93 revised in 2000 (Direct Method) and AOCS Cd 16-81 revised in 2000 (Indirect Method). Using SFC, a melting curve or SFC profile can be created by measuring SFC for a fat sample at several different temperatures and then plotting the SFC measurements as a function of temperature.

Exemplary palm oil-based shortenings can exhibit an SFC profile that falls within the following ranges of solid fat (percent) in a shortening at certain temperatures: from about 47 to 63 percent at 10 degrees C., from about 20 to 40 percent at 20 degrees C., from about 4 to 21 percent at 30 degrees C., up to about 12 percent at 40 degrees C.; alternately from about 49 to 57 percent at 10 degrees C., from about 23 to 39 percent at 20 degrees C., from about 6 to 19 percent at 30 degrees C., up to about 10 percent at 40 degrees C.

Another property that is useful to characterize a fat composition is Mettler Drop Point (MDP). Examples of palm oil-based shortenings useful in a frosting as described can exhibit a Mettler Drop Point (MDP) that ranges from about 90 degrees Fahrenheit to about 130 F, e.g., from about 95 to about 120 degrees F., or from about 100 to about 115 degrees F.

Iodine value (I.V.) is another trait useful to characterize fat compositions. Certain exemplary palm oil-based shortenings useful in frostings as described can have an iodine value of about 44 to 57, e.g., from about 48 to 53.

Preferred palm oil-based shortening can be beta prime crystal form tending fat materials, meaning fat materials that include a solid phase that is substantially in a beta prime phase crystalline form (i.e., at least 50% of the solids). Descriptions of such beta prime phase tending shortenings and their rapid cooling methods of preparation are found in U.S. Pat. No. 2,801,177 (issued Jun. 30, 1957 to E. S. Lutton and U.S. Pat. No. 3,253,928 (issued May 31, 1966 to Bedenk et al), which are incorporated herein by reference.

The palm oil-based shortening can also be characterized based on a Rate of Crystallization (ROC) profile. Rate of Crystallization of a fat is a measure of the amount of crystallized solids (solid fat) contained in the fat over a period of time at which the temperature of the sample is reduced under controlled conditions. The palm oil-based shortening should exhibit a ROC profile that allows crystals to form in the total fat ingredients of a frosting, during processing, especially during early processing of frosting ingredients to produce a low density frosting.

A Rate of Crystallization of a palm oil-based shortening that may be useful with other ingredients to prepare a low density frosting as described, may exhibit a ROC profile as follows: at least about 15 percent solids at 2.5 minutes, at least about 21 percent solids at 5 minutes, at least about 28 percent solids at 7.5 minutes, and a least about 30 percent solids at 10 minutes. An alternate or preferred ROC profile of the palm oil-based shortening may be: from about 15 to about 25 percent solids at 2.5 minutes, from about 22 to about 35 percent solids at 5 minutes, from about 30 to about 40 percent solids at 7.5 minutes, from about 32 to about 42 percent solids at 10 minutes.

Useful non-hydrogenated palm oil-based shortenings that include substantially entirely whole palm oil, fractionated palm oil, or blends thereof, are commercially known and available. Such products can range from commodity whole palm oil (IV~~50-56, MPD~35-39 C) to blends of whole palm with fractionated palm oil Components such as palm stearin (IV~14-40, MPD~44-52 C).

Examples of commercially available non-hydrogenated palm oil-based shortening ingredients include those that are whole palm oil (100 percent palm oil), and others that are a mixture of whole palm oil and palm stearine (e.g., from 90:10, 80:20, or 60:40 palm oil:palm stearin). Some examples of the latter mixtures may exhibit properties that include the following: SFC (@10 Deg C.: 53-61; @20 Deg C.: 30-38; @30 Deg C.: 10-18; @40 Deg C.: <8). (IV~48-52, MDP~39-44.5 C). Some examples of the former whole palm oils may exhibit an SFC profile as follows: @10 Deg C.: 47-57; @20 Deg C.: 21-25; @30 Deg C.: 7-14; @40 Deg C.: <6).

The presently described frosting compositions can contain any useful amount of the non-hydrogenated palm oil-based shortening ingredient, meaning an amount to form a low density frosting as described, preferably a low density frosting that exhibits stability as measured by the Stir-Down Test described herein. Exemplary amounts can be from about 15 to about 30 weight percent, preferably about 20 to about 28 weight percent of the described palm oil-based shortening based on total weight frosting.

The described low density frosting also includes a crystal-enhancing fat ingredient that improves or allows for processing of the total fat ingredients with other frosting ingredients to form a low density frosting, especially one having good long term stability. The described non-hydrogenated palm oil-based shortening ingredients have been found to exhibit certain organoleptic properties desirable in a frosting product. But as identified by the Applicant, these same palm oil-based shortenings are not by themselves as a sole fat ingredient capable of providing a frosting ingredient composition that can be processed into a low density frosting. When the described non-hydrogenated palm oil-based shortening ingredients have been included as the only fat ingredient in a frosting formulation, the resultant frosting ingredients have been found to be not capable of being processed by aeration to produce a low density frosting composition, especially one that is stable as measured by the Stir-Down Test.

The present invention includes the discovery that a small amount of another type of fat ingredient that is inter alia solid at room temperature, can be added to non-hydrogenated palm oil-based shortening ingredients and the resultant blend, when used as the total fat ingredients of the frosting, is capable of being combined with other frosting ingredients and processed into a low density frosting. The frosting ingredients form a low density composition during processing, and the low density frosting is sufficiently stable to be stored and transported for commercial sale, and can preferably be capable of passing the Stir-Down Test described herein.

According to the described frostings a small amount of crystal-enhancing fat ingredient can be combined with the palm oil-based shortening to produce total fat ingredients of the frosting that can be included with other frosting ingredients to produce a useful low density frosting, preferably with good stability. The crystal-enhancing fat ingredient is a fat that is solid at room temperature, and that can be combined with the palm oil-based shortening ingredient to produce total fat ingredients that can be processed into a low density frosting, especially one that exhibits stability as measured by the Stir-Down Test. If frosting ingredients contain only the palm oil-based shortening as described (i.e., total fat ingredients are only the palm oil-based shortening, e.g., whole palm oil or a combination of whole palm oil and stearin fraction), the frosting ingredients have been found to not be capable of being processed into a low density frosting. But when a small amount of the crystal-enhancing fat ingredient (as described herein) is used in combination with the palm oil-based shortening (i.e., total fat ingredients are the palm oil-based shortening and the crystal-enhancing fat ingredient), blends of these two fat ingredients have been found to be capable of being processed into a low density frosting that is preferably stable as measured by the Stir-Down Test.

In brief, and without being bound by theory, a crystal-enhancing fat ingredient has been found to improve the ability of a composition of frosting ingredients to be processed into an aerated low density form, and to increase the stability of the formed low density frosting. The crystal-enhancing fat ingredient may function by increasing the rate or amount of crystals that are present in a frosting during processing, especially during an early stage of processing (within a first two or three minutes of processing by mixing at a reduced temperature). The early-stage crystals improve formation of an aerated low density frosting by proving solid structure around air cells. A low density frosting structurally includes a supportive three-dimensional matrix formed about thousands of tiny air cells. Crystals in the matrix function as a solid supportive structure of the matrix that surrounds and supports the air cells. A matrix made more stable by solid crystals can inhibit or prevent the otherwise natural coalescence of the air cells. Solid crystals formed during early processing allow rapid formation and strengthening of the three dimensional matrix. After formation the crystals continue to support, strengthen, and maintain the matrix, sustaining the low density aerated form over extended storage periods.

The ability of a fat material to form crystals, especially during early stages of processing into a low density frosting, can be assessed as the Rate of Crystallization (ROC) of the fat material. And, as described, the Rate of Crystallization of total fat ingredients of a frosting formulation has been found to relate to the ability of frosting ingredients that contain the total fat ingredients to be processed into a low density frosting. Rates of Crystallization of any particular palm oil-based shortening blended with crystal-enhancing fat ingredient have been identified to be higher than the Rate of Crystallization of that palm oil-based shortening absent the crystal-enhancing fat ingredient. In addition, while the lower-ROC palm oil-based shortening may be incapable of being processed into a low density frosting, blends of the same palm oil-based shortening combined with crystal-enhancing fat ingredient, wherein the blends exhibit ROC higher than the palm oil-based shortening alone, have been processed into useful and preferably highly stable low density frostings.

Accordingly, a useful amount of crystal-enhancing fat ingredient in a low density frosting, or in a portion of total fat ingredients of a low density frosting, can be an amount that allows frosting ingredients that include the total fat ingredients (with a blend of palm oil-based shortening ingredient and crystal-enhancing fat ingredient) to be processed to form a low density frosting. Preferred amounts are amounts that allow the frosting ingredients to be formed into a low density frosting that is stable as measured by the Stir-Down Test. The amount and useful ranges may depend on the specific crystal-enhancing fat used in the frosting. Useful amounts may be expressed in terms relative to an amount of total fat ingredients of a low density frosting, relative to an amount of total frosting ingredients, or as an amount that results in total fat ingredients that exhibit a desired ROC profile (see below) effective to form a low density frosting.

Relative to total fat ingredients a useful amount of crystal-enhancing fat ingredient may be an amount of up to about 25 weight percent crystal-enhancing fat ingredient based on total fat ingredients, e.g., from about 5 to about 22 weight percent, or from about 7 to about 20 weight percent crystal-enhancing fat ingredient based on the weight of the total fat ingredients.

Relative to total frosting ingredients, the amount of crystal-enhancing fat ingredient may be up to about 5 weight percent crystal-enhancing fat ingredient based on total frosting ingredients, e.g., from about 0.5 to about 4 weight percent, or from about 1 to about 3 weight percent based on total fat ingredients.

Considered based on function, a useful amount of crystal-enhancing fat ingredient can be any amount that, when used in combination with a palm oil-based shortening, provides total fat ingredients that have a Rate of Crystallization that allows the total fat ingredients to be formed into a low density frosting when combined with other frosting ingredients. A useful Rate of Crystallization of total fat ingredients may be one that reflects a functional improvement of the total fat ingredients relative to the ROC of the palm oil-based shortening of the total fat ingredients by itself. For example, a Rate of Crystallization of total fat ingredients should be more than insignificantly higher than the Rate of Crystallization of the palm oil-based shortening component alone. An ROC profile is obtained by taking a series of percent solids measurements of a fat sample over a period of time, such as regularly and periodically over a 10 minute period, e.g., at about every 30 seconds. To be considered more than an insignificant amount higher than a Rate of Crystallization of a palm oil-based shortening ingredient (alone) of total fat ingredients, percent solids measurements of an ROC profile of the total fat ingredients should exceed the percent solids measurements of an ROC profile of the palm oil-based shortening ingredient (alone) over substantially an entire 10 minute ROC profile, by an amount of at least 5 percent, preferably by at least 10, 15, 20, 25, or 30 percent (for example, a 20 percent increase in percent solids exists if the percent solids of the shortening ingredient is 10 and the percent solids of the total fat ingredients is 12). According to certain embodiments of total fat ingredients, a solid percent measurement of total fat ingredients can exceed the solid percent measurement of the palm oil-based shortening (alone) by at least 10, 20, or 25 percent, at least at a measurement taken at 2.5 minutes; preferably a solid percent measurement of total fat ingredients can also exceed the solid percent measurement of the palm oil-based shortening (alone) by at least 5, 10, 15, 20, or 25 percent, at one or more measurement taken at 5, 7.5, and 10 minutes.

Another way to characterize a useful Rate of Crystallization of total fat ingredients is in terms that are independent of a Rate of Crystallization of the palm oil-based shortening (alone) of the total fat ingredients. For example, a Rate of Crystallization of total fat ingredients that may be useful to prepare a low density frosting as described, may include a percent fat measurement of at least 20 percent solids, e.g., 21 or 23 percent solids at 2.5 minutes. In certain embodiments the Rate of Crystallization may be expressed as a ROC profile as follows: at least about 20 (e.g., from about 22 to about 35) percent solids at 2.5 minutes, at least about 30 (e.g., from about 32 to about 50) percent solids at 5 minutes, at least about 35 (e.g., from about 39 to about 52) percent solids at 7.5 minutes, and at least about 39 (e.g., from about 39 to about 55) percent solids at 10 minutes.

Examples of specific crystal-enhancing fat ingredients include fat ingredients that are solid at room temperature, such as room temperature solid hydrogenated fats (either partially-hydrogenated or fully-hydrogenated), room temperature solid fractionated fats, room temperature solid interesterified fats, and the like. Examples of such fat materials are known to contain a high percentage (e.g., at least 92, 95, or 98 percent) of tri-glycerides that contain a significant amount of saturated fatty acid residues. Some may also contain a substantial amount of trans fatty acid residues, e.g., up to about 30, 40, or 50 percent trans fats based on total weight crystal-enhancing fat ingredient.

A crystal-enhancing fat ingredient may be a fat that is naturally solid at room temperature or that is naturally liquid at room temperature, and that has been processed to be solid at room temperature, e.g., by one or more of fractionation, interesterification, or hydrogenation (partially-hydrogenated or fully-hydrogenated). The crystal-enhancing fat ingredient may be a combination of two or more such materials. Examples of useful crystal-enhancing fat ingredients include fully-hydrogenated fats having a Mettler Drop Point (MDP) that ranges from about 120 F to about 150 F, e.g., from about 130 F to 148 F, or from about 136 F to 140 F, one single example being fully-hydrogenated soybean oil. Other examples of useful crystal-enhancing fat ingredients include partially-hydrogenated fats having a Mettler Drop Point (MDP) that ranges from about 95 F to about 130 F, e.g., from about 100 F to about 120 F, examples being partially-hydrogenated cottonseed oil, partially-hydrogenated soybean oil, and combinations of partially-hydrogenated cottonseed oil and partially-hydrogenated soybean oil.

Exemplary crystal-enhancing fat ingredients can exhibit a useful SFC profile, which may depend on the type of ingredient, such as whether the crystal-enhancing fat ingredient is fully-hydrogenated or partially-hydrogenated.

Examples of fully-hydrogenated crystal-enhancing fat ingredients can exhibit a SFC profile that falls within the following ranges of solid fat (percent) in a shortening at certain temperatures: from about 90 to about 100 percent at 10 degrees C., from about 90 to about 100 percent at 20 degrees C., from about 70 to about 100 percent at 30 degrees C., from about 60 to about 100 percent at 40 degrees C.; alternately from about 95 to about 100 percent at 10 degrees C., from about 85 to about 100 percent at 20 degrees C., from about 75 to about 100 percent at 30 degrees C., from about 65 to about 100 percent at 40 degrees C.; and, alternately from about 95 to about 100 percent at 10 degrees C., from about 90 to about 100 percent at 20 degrees C., from about 85 to about 100 percent at 30 degrees C., from about 75 to about 100 percent at 40 degrees C.

Examples of partially-hydrogenated crystal-enhancing fat ingredients can exhibit a SFC profile that falls within the following ranges of solid fat (percent) in a shortening at certain temperatures: from about 75 to about 100 percent at 10 degrees C., from about 65 to about 90 percent at 20 degrees C., from about 30 to about 55 percent at 30 degrees C., from about 0 to about 20 percent at 40 degrees C.; alternately from about 75 to about 90 percent at 10 degrees C., from about 65 to about 85 percent at 20 degrees C., from about 35 to about 50 percent at 30 degrees C., from about 5 to about 15 percent at 40 degrees C.; alternately from about 77 to about 85 percent at 10 degrees C., from about 67 to about 80 percent at 20 degrees C., from about 35 to about 45 percent at 30 degrees C., from about 7 to about 13 percent at 40 degrees C.

The crystal-enhancing fat ingredients can additionally or alternately be characterized on Iodine Value, percent trans fat content, each of which may depend on the type of ingredient such as whether the crystal-enhancing fat ingredient is fully-hydrogenated or partially-hydrogenated. Examples of useful crystal-enhancing fat ingredients include fully-hydrogenated fats (one single example being fully-hydrogenated soybean oil) having an Iodine Value of not greater than 15, e.g., not greater than 10, or not greater than 5. Examples of useful crystal-enhancing fat ingredients include fully-hydrogenated fats (one single example being fully-hydrogenated soybean oil) having not greater than 10 weight percent trans fat, e.g., less than 5 weight percent trans fat or less than 2 weight percent trans fat based on total weight crystal-enhancing fat ingredient. Examples of useful crystal-enhancing fat ingredients include partially-hydrogenated fats (examples including partially-hydrogenated cottonseed oil, partially-hydrogenated soybean oil, and combinations of partially-hydrogenated cottonseed oil and partially-hydrogenated soybean oil) having an Iodine Value of not greater than 100, e.g., from about 10 to about 100, from about 20 to about 90, or from about 30 to about 70. Examples of useful crystal-enhancing fat ingredients include partially-hydrogenated fats (examples including partially-hydrogenated cottonseed oil, partially-hydrogenated soybean oil, and combinations of partially-hydrogenated cottonseed oil and partially-hydrogenated soybean oil) having not greater than 60 weight percent trans fat, e.g., from about 20 to about 60 weight percent trans fat, from about 20 to about 40 weight percent trans fat, or from about 25 to about 35 weight percent trans fat based on total weight crystal-enhancing fat ingredient.

A crystal-enhancing fat ingredient may be any oil or fat-based ingredient or derivative thereof that can exhibit a solid form a room temperature and that can be combined with a non-hydrogenated palm oil-based shortening to produce total fat ingredients that may be combined with other frosting ingredients to form a low density frosting as described, optionally and preferably a fat that combines with the palm oil-based shortening to produce a blend of crystal-enhancing fat ingredient and palm oil-based shortening that exhibits at least one of the desired ROC profiles described herein. Examples include fats derived from non-tropical or tropical sources and processed to reduce a melting point or desirably effect on or more other physical property for use as the crystal-enhancing fat ingredient. Some specific examples include room temperature solid fat materials derived from palm, palm kernel, soybean, rapeseed (canola), sunflower, peanut, hazelnut, walnut, cottonseed, olive, corn, grapeseed, rice bran, sesame, safflower, linseed/flax, oat, wheat germ, copra oil, cottonseed oil, coconut oil, rice bran oil, palm kernel oil (e.g., fractionated palm kernel oil), and the like. Certain more specific examples include room temperature solid fat materials derived from low linolenic soybean oil, high oleic canola oil, and high oleic soybean oil. Others include room temperature solid fat materials derived from fats that include triglycerides derived from microorganisms, animals (e.g., lard, tallow, butter), and plants. Any of these may optionally be natural, processed by interesterification, hydrogenation, or fractionation, genetically modified, or trait enhanced.

Exemplary crystal-enhancing fat ingredients can be produced by hydrogenating (partially or fully, as desired) unsaturated fatty acids that are present in a natural, fractionated, modified, or otherwise processed oil, to increase the amount of saturated fatty acids. Techniques for hydrogenation of oils are known and include, for example, reacting a base oil having unsaturated fatty acids with hydrogen gas in the presence of a hydrogenation catalyst, for example, a supported nickel catalyst. The hydrogenated fat product may be partially or fully-hydrogenated. Representative hydrogenated room temperature solid fats useful as a crystal-enhancing fat ingredient include fully or partially-hydrogenated soybean oil, fully or partially-hydrogenated cottonseed oil, fully or partially-hydrogenated palm oil, fully or partially-hydrogenated palm kernel oil, fully or partially-hydrogenated coconut oil, fully or partially-hydrogenated canola oil, and mixtures thereof.

The combination of the palm oil-based shortening and the crystal-enhancing fat ingredient can preferably be all of the fat ingredients in a frosting, i.e., the total fat ingredients of a frosting. For example, total fat ingredients can contain at least 90, 95, or 99 weight percent palm oil-based shortening and crystal-enhancing fat ingredient. On the other hand, some small amount of other fats can also be allowed in the frosting, i.e., in the total fat ingredients, provided that the amount is sufficiently small to allow formation of a desired low density frosting. To the extent that total fat ingredients include a fat material in addition to the palm oil-based shortening and the crystal-enhancing fat ingredient, the amount should be small or minor, e.g., less than 10 weight percent of the total fat ingredients, preferably less than 10, 5, 3, 2, or 1 weight percent of the total fat ingredients.

Total fat ingredients of a frosting can exhibit a Mettler Drop Point (MDP) that ranges from about 100 F to 131 F, e.g., from about 104 F to 122 F.

Exemplary total fat ingredients can exhibit an SFC profile that falls within the following ranges of solid fat (percent) in a shortening at certain temperatures: from about 55 to about 70 percent at 50 degrees F., from about 25 to about 55 percent at 70 degrees F., from about 18 to about 40 percent at 80 degrees F., from about 8 to about 30 percent at 90 degrees F., and from about 0 to about 20 percent at 100 degrees F.; alternately from about 56 to about 67 percent at 50 degrees F., from about 30 to about 50 percent at 70 degrees F., from about 19 to about 37 percent at 80 degrees F., from about 10 to about 26 percent at 90 degrees F., and from about 2 to about 17 percent at 100 degrees F.

Total fat ingredients can be low in trans fats, e.g., may contain less than about 10 weight percent, less than 5 weight percent, or less than 2 or 1 weight percent trans fat based on the weight of the total fat ingredient.

A nutritive carbohydrate sweetening agent or "sugar" is the principal sweetening ingredient in a low density frosting as described, and a principal ingredient overall. The sweetening agent provides bulk and body to the frosting and contributes to organoleptic properties of the frosting such as sweetness, texture, consistency, viscosity, density, and taste.

Useful as the sweetening ingredient are any of a variety of edible oligosaccharides having one, two, or more saccharide groups including for example, sucrose, fructose, dextrose, maltose, lactose, galactose, sorbitol, and mixtures thereof. These sugars can be used in any of a variety of conventional forms, such as, for example, cane sugar, beet sugar, corn syrup, corn syrup solids, brown sugar, maple sugar, maple syrup, honey, molasses, and invert sugar. Preferably, sweetening agent can be selected from the group consisting of sucrose, fructose, dextrose, maltose, and mixtures thereof. More preferably, sweetening agent can be a mixture of sucrose and corn syrup, which generally is a mixture of dextrins, maltose, fructose, and dextrose. Most preferably, the sweetening agent can be sucrose, e.g., powdered sugar.

The amount of sweetening agent in a low density frosting can be adjusted within a desired range to achieve a desired sweetness level and suitable organoleptic properties. Desired organoleptic properties can be similar previous aerated cream icings or butter-cream frostings, e.g., smooth texture, short consistency, spreadability without flowing or running, and a density of about 0.75 to 0.95 glee, more particularly from about 0.75 to 0.9 g/cc or from 0.75 to 0.85 glee. Exemplary amounts of sweetening agent in the low density frosting can be from about 50 to about 85 weight percent, or from about 55 to about 80 weight percent, especially from about 58 to about 72 weight percent based on total weight frosting.

In certain frosting embodiments, a sweetening agent can be a blend of sucrose and corn syrup, which also functions as a plasticizer and humectant. In such embodiments, sucrose can be included in an amount in a range from about 50 to 70 weight percent, e.g., from about 53 to about 62 weight percent, based on total weight frosting. Corn syrup can be included in an amount in a range from about 2 to 20 weight percent of the frosting, such as from about 4 to about 12 weight percent based on total weight frosting. Higher syrup levels are especially useful for cocoa flavored products.

The low density frosting can also include emulsifier to providing desired texture, a spreadable consistency, body, and a creamy mouth feel. An emulsifier may also be useful to stabilize the low density frosting, provide freeze/thaw stability, increase viscosity, or prevent icing breakdown due to moisture weeping.

Some emulsifiers, e.g., monoglycerides, have relatively higher melting points compared to the fat ingredients. Consequently, as more emulsifier is added to the shortening to form an emulsified shortening, melting point and hardness may increase. As an increased emulsifier level hardens the shortening, blending with other frosting ingredients becomes more difficult. Thus, a first portion of emulsifier may be preblended with a fat ingredient, and one or more additional portion may be added to frosting ingredients in dry powder form or liquid form.

Certain useful emulsifiers include monoglycerides. A monoglyceride can affect properties of fat ingredients of a frosting, such as by aiding dispersion of fat ingredients throughout the other frosting ingredients, e.g., sugar syrup. Certain examples of monoglyceride emulsifiers include mixtures of monoglycerides of higher fatty acids; e.g., a combination of 75 to 80% oleic acid with the balance being linoleic acid and having an iodine value ("IV") substantially less than 50. Monoglyceride ingredients (e.g., distilled monoglyceride) will contain low levels of other materials such as diglycerides or monoglycerides of other fatty acids or degrees of unsaturation. Mono- and diglyceride blends can be used if a monoglyceride fraction has desired iodine value and fatty acid chain length. Monoglycerides can be useful in any amount that can result in a desired low density frosting as described, such as from 0.5 to 0.8 weight percent monoglyceride ingredient based on total weigh frosting.

Other exemplary emulsifiers include esters of polyhydric alcohols (especially sorbitan esters) such as polyoxyethylene fatty acid esters of polyhydric alcohols, especially polyethoxylated esters of sorbitan such as Polysorbate 60 (polyoxy-20-ethylene sorbitan stearate) and polyoxyethylene sorbitan monostearate (e.g., Tween-60 and Tween-80), polyglycerol esters of higher fatty acids, Polysorbate 80 (i.e., a polyoxy-20-ethylene sorbitan monooleate), and mixtures thereof. Polysorbate 80 can be included in combination with polyglycerol ester. Preferred polyglycerol esters are selected from the group consisting of triglycerol monostearate, decaglycerol monooleate, decaglycerol monopalmitate, decaglycerol dipalmitate, hexaglycerol monostearate and mixtures thereof. Especially useful herein as a PGE is decaglycerol dipalmitate. Other suitable emulsifiers include unmodified monoglycerides, mono and diglyceride blends, triglycerol monostearate, sorbitan esters, propylene glycol fatty acid esters, and lecithin. Exemplary useful high HLB emulsifiers include ethoxylated monoglycerides, polysorbates, ethoxylated sorbitans, decaglycerol esters, e.g., decaglycerol dipalmitate.

Emulsifier can be added one or a combination of frosting ingredients directly, as a single ingredient, or in a variety of forms, such as a component of another ingredient such as a fat. The total amount of emulsifier (e.g., a single emulsifier or a combination of emulsifiers) in a low density frosting can be any amount useful to produce a desired frosting. A total level of emulsifier can be selected to achieve low density in combination with other frosting properties such as a creamy, rich mouth feel, smooth texture, a desired consistency, spreadability, viscosity, rand desired density and stability. Exemplary amounts of emulsifier can be from about 0.5 to about 5 weight percent, e.g., from 0.5 to about 4 weight percent, based on total weight frosting.

The low density frosting can include a viscosity building ingredient to provide desirable body, texture, and stability. Suitable examples include hydrocolloids such as guar gum, locust bean gum, alginates, xanthan gum, agar-agar, gellan gum, gelatin, pectin and low-methoxyl pectin and water soluble cellulose materials such as sodium carboxymethylcellulose, and methyl cellulose, microcrystalline cellulose and mixtures thereof. A specific example of a viscosity building is moderate to high viscosity carboxymethylcellulose (7500 cps at 1% solution). The carboxymethylcellulose can be used at about 0.03 to 0.08 weight percent, preferably about 0.04 to 0.07 weight percent (based on total weight frosting). A particular example is marketed as AVICEL, which is a mixture of microcrystalline cellulose and sodium carboxymethylcellulose, available from Food and Pharmaceutical Products Division of FMC Corporation, Philadelphia, Pa.

The type and amount of viscosity agent can vary to provide desired end product attributes. Good results may be obtained when the frosting contains from about 0.04 to about 3 weight percent viscosity agent, e.g., from about 0.15 to 0.2 weight percent, especially when the viscosity agents comprise a mixture of carboxymethylcellulose and xanthan gum.

The low density frosting can have a total moisture content ranging from about 10 to 20 weight percent, e.g., from abut, preferably about 11 to about 16 weight percent or from about and more preferably about 13 to 15 weight percent, based on total weight frosting. The moisture is supplied in part by moisture associated with the syrup component, but primarily by added water.

The low density frosting can optionally also include any of a variety of adjuvant materials to modify the nutritional, organoleptic, flavor, color, or other properties of the frosting. In particular, the low density frosting may include one or more fat replacer, e.g., sucrose polyesters or hydrated colloidal protein dispersions (such as SIMPLESSE fat replacer, which is available from The NutraSweet Company). The low density frosting optionally further include sugar replacers or bulking agents such as polydextrose, low DE maltodextrins, or specially modified starches. Purified polydextrose, which can be used to replace both sugar and fat, is disclosed in U.S. Pat. No. 4,622,233. If present, such fat or sugar substitutes can each comprise about 0.1 to 15% of the present compositions, preferably less than about 12%.

Additionally, synthetic and natural flavorings or coloring agents can be included in a low density frosting as described. Exemplary flavors include cream or cream cheese flavor, milk powder, chocolate, vanilla extract, vanilla powder, cocoa substitute, hazelnut, dutched cocoa, mint, lemon and mixtures thereof. The flavoring agents are preferably used in amounts of about 0.01 to 3%. The coloring agents are preferably used in amounts of about 0.01 to 0.05%. Also, flavor materials and particulates such as fruit and fruit extracts, nuts, chips, and the like, can be added to the frosting compositions as desired.

Other additives can be present in the low density frosting in minor amounts, e.g., less than about 1 weight percent, preferably less than about 0.5 weight percent, if desired. These include, for example: salt, whiteners, such as titanium dioxide, etc., mold inhibitors, such as potassium sorbate, sorbic acid, dehydroacetic acid, sodium benzoate, etc., sequestering agents, acidulants, buffers, food acids, preservatives, antioxidants, such as butylated hydroxytoluene, butylated hydroxyanisole, etc., vitamins, minerals, and the like.

The low density frosting can be prepared by methods that include steps of combining ingredients, blending or mixing, aerating, heating, cooling, etc., examples of which steps and methods are known. One example of a process of preparing a low density frosting is illustrated at FIG. 1.

Referring to FIG. 1, it shows a schematic process flow of an exemplary method 10. A first step is blending 12 of a combination of certain frosting ingredients to form a uniform mixture by first mixing or blending together in any order sweetening agent (e.g., sugar) and water, fat ingredients, and optionally viscosity agent, emulsifier, and other additives, in such a manner as to achieve a uniform fluid blend of these ingredients. A ribbon blender is suitable to perform a blending step 12.

Blending step 12 can involve preblending substeps or ingredient handling. For example a combination (optionally pre-mixed) of heated ingredients can be added together into a blender or mixer, the ingredients including emulsifier (15), molten shortening (e.g., palm oil-based shortening ingredients), other fats including crystal-enhancing fat ingredient, and monoglyceride. The palm oil-based shortening ingredient can be added in a plastic or may be added to the ribbon blender (12) in a heated melted form, e.g., at a temperature of at least about 130 F, such as from about 130 to about 145 F (54 to 63 C) and optionally may be added as the final ingredient to the combination. Insufficiently heated frostings may permit some undesirable crystallization of the fat ingredients. A similar process is shown at U.S. Pat. No. 5,529,800, the entire content of which is incorporated herein by reference.

Blending step 12 can also include a preblending step 16, which prepares a preblend of minor ingredients 20 with water 18 to form a slurry. The slurry formation allows for hydration of viscosity agent. The preblend dry mix 20 contains minor ingredients such as flavor, color, and emulsifier. The preblend can be mixed with water 18, for a useful amount of time such as about five minutes.

The preblended slurry and melted shortening, fat, and monoglyceride ingredients form an emulsion upon blending (12). To the blended emulsion, powdered sugar 22 is added and further mixing is conducted. In preferred variations, the blending step 12 can involve a period of high shear blending to break up and disperse the dry ingredients. Also. In preferred variations, the shortening ingredient is added last to the mixture, after all other ingredients of this step.

During the mixing period (e.g., approximately five minutes), fat ingredients dispersed in the product are cooled to about 95 F, at which temperature seeding and crystallization of up to about 5 weight percent of the total fat ingredients occurs. During blending step 12 the hardest fractions of the total fat ingredients (e.g., the crystal-enhancing fat ingredient) begin to crystallize to "seed" the still liquid palm oil-based shortening ingredient.

The process 10 also includes a step of homogenizing 30 the blend obtained from step 12 to form a homogenized frosting composition or frosting base. An example of a useful homogenizing step 30 can involve a two-stage piston (e.g., 100 psi, 750 psi) homogenizer. The homogenization step can reduce the fat particle size to a few microns in diameter. The homogenized base is warmed by about 2 degrees C. by the work of the homogenization step.

A next step (40) can be to cool the homogenized frosting base to a temperature of about 15.5 to about 26.2 C (about 60 to about 80 F). A cooling step can be useful to convert a molten shortening in the homogenized base into plastic shortening in situ after it has been dispersed in the frosting base. Rapid cooling can facilitate crystallization of the shortening into a highly beta prime crystalline form. Rapid cooling may facilitate desired growth of beta prime tending fat crystals, which stabilize small air cells and inhibit coalescence of the air cells. For example, immediately after homogenization the product may be passed through a swept surface heat exchanger and cooled to less than 70 F (21 C). A suitable device for this step, referred to as a "Votator," is described in U.S. Pat. No. Re. 21,406 to C. W. Vogt, Mar. 19, 1940.

The cooled homogenized frosting base can subsequently be mixed with nitrogen gas 46 or another inert gas. The gas can be sparged into the votated frosting base. Any conventional method can be used. For example, the gas can be forced through small orifices into the composition as the composition flows through a tube or vessel into a mixing chamber, where uniform distribution occurs. Any conventional nontoxic, odorless, tasteless propellant, such as air, nitrogen, nitrous oxide, carbon dioxide, and mixtures thereof can be used.

Process 10 can also include a step (50) of aerating or whipping the cooled, homogenized, frosting base from a native density to a density of about 0.75 to 0.95 glee. During aeration, the temperature of the frosting base can be controlled by simultaneous cooling so that the frosting product remains below about 32 C. (90 F) during the aeration step. The cooling can offset heat generated in the frosting during the aeration step. Maintaining the temperature below 95 F (35 C) can be effective to maintain the fat in a desired crystal state which, in turn, can reduce or minimizing air cell collapse upon extended storage. A preferred target temperature may be 90 to 94 F (32 to 34 C).

The frosting ingredients (cooled homogenized frosting base) can be aerated from a native density of the of about 1.2 to about 1.4 grams per cubic centimeter, to provide a finished low density frosting having a density of from about 0.70 to 0.95 glee, preferably about 0.75 to 0.85 glee. Even a stable low density frosting may exhibit some tendency to coalesce as observed by a modest increase in density over extended storage times. Preferred low density frostings can be stored (e.g., at 70 F) for weeks (2, 4, 6 weeks) or months (1, 2, 4 months) while maintaining a density in a range from 0.75 to 0.95 Wee, e.g., from about 0.75 to about 0.90. Particularly preferred embodiments of the low density frosting can also pass the Stir-Down Test after weeks or months of such storage, by having a density that does not fall below 0.94 grams per cc, preferably not below 0.90 grams per cc, upon stir-down.

The aerated low density frosting can be packaged 60 in suitable air tight containers or packages (e.g., plastic tubs) for commercial distribution and sale. In certain embodiments the packaging step can include a gentle, low shear packaging step with minimum piping to avoid collapse of the frosting, and can occur within 15 minutes of aeration.

The preparation process can desirably exclude a step of handling (e.g., pumping) the aerated frosting in a manner that substantially increases the density of the frosting, such as to a density of greater than 0.95 grams per cubic centimeter. Pumping or other techniques that impart shear to the aerated product can result in weakening the low density air cell-containing structure. Excessive post-aeration shear may undesirably result in stirring the product down to its native (non-aerated) density. In preferred packaging methods, the product can be fed to a sealable hopper. Low pressure air (10 to 15 psig) can be supplied to the hopper from which the product is fed into tubs using air pressure rather than pumping.

EXAMPLES

The following examples show fat materials processed according to steps for forming a low density frosting. As shown, various examples of total fat ingredients that include palm oil-based shortening ingredient in combination with crystal-enhancing fat ingredient are useful to form a low density frosting, whereas the same palm oil-based shortening ingredient by itself (in the absence of the crystal-enhancing fat ingredient) was not.

Three palm oil-based shortening ingredients were used in the examples:

Shortening 1
MDP: 37 to 41 degrees Celsius (98 to 106 degrees Fahrenheit).
SFC from about 49 to 57 percent at 10 degrees C., from about 23 to 30 percent at 20 degrees C., from about 6 to 13 percent at 30 degrees C., up to about 4 percent at 40 degrees C.
Iodine Value 51-53.
Free fatty acid (oleic) not more than 0.05 weight percent.

Shortening 2
MDP: 39 to 44 degrees Celsius (102 to 111 degrees Fahrenheit).
SFC from about 48 to 51 percent at 10 degrees C., from about 30 to 38 percent at 20 degrees C., from about 10 to 18 percent at 30 degrees C., up to about 8 percent at 40 degrees C.

Samples 1, 4, and 7 are 100 percent Shortening 1, Shortening 2, or Shortening 3, respectively.

Sample numbers 2, 5, and 8 include 14 percent of Crystal-Enhancing Fat Ingredient #1 (fully-hydrogenated soybean oil) and 86 percent of Shortening 1, Shortening 2, and Shortening 3, respectively.

Sample numbers 3, 6, and 9 include 14 percent of Crystal-Enhancing Fat Ingredient #2 (partially-hydrogenated cottonseed and soybean oil blend) and 86 percent of Shortening 1, Shortening 2, and Shortening 3, respectively.

Each Sample was used as the total fat ingredients of a low density frosting, along with other ingredients including sugar, emulsifier, water, etc., which were the same for the frosting made from each Sample. Each of the frostings was tested for density (D)(grams/cubic centimeter), Stir-Down density (S.D.D.)(grams per centimeter), and viscosity (V) (percent torque), at 24 hours after preparation, 7 days after preparation, and 14 days after preparation. Results are in the following table.

| Sample | Shortening/Crystal-Enhancing Fat Ingredient | 24 hr | | | 7 Day | | | 14 Day | | |
|---|---|---|---|---|---|---|---|---|---|---|
| | | D | S.D.D | V | D | S.D.D | V | D | S.D.D | V |
| | Preferred ranges | 0.78-.82 | <0.9 | >14 | 0.78-.82 | <0.9 | >14 | 0.78-.82 | <0.9 | >14 |
| 1 | 1/n.a. | 0.88 | 0.97 | 8.7 | 0.87 | 0.96 | 10.6 | 0.88 | 0.96 | 12.1 |
| 2 | 1/#1 | 0.8 | 0.82 | 18.7 | 0.79 | 0.83 | 21.2 | 0.8 | 0.85 | 25.4 |
| 3 | 1/#2 | 0.78 | 0.79 | 15.6 | 0.77 | 0.77 | 16.7 | 0.78 | 0.79 | 16.1 |
| 4 | 2/n.a. | 0.78 | 0.91 | 8.8 | 0.8 | 0.9 | 10.6 | 0.78 | 0.91 | 10.6 |
| 5 | 2/#1 | 0.79 | 0.8 | 17.5 | 0.77 | 0.79 | 22.2 | 0.79 | 0.83 | 25.3 |
| 6 | 2/#2 | 0.79 | 0.8 | 16.4 | 0.78 | 0.78 | 18.4 | 0.78 | 0.79 | 20.1 |
| 7 | 3/n.a. | | 0.88 | 9 | 0.79 | 0.89 | 13 | 0.82 | 0.92 | 14 |
| 8 | 3/#1 | 0.79 | 0.82 | 17.7 | 0.79 | 0.82 | 29 | | | |
| 9 | 3/#2 | | 0.81 | 19 | 0.76 | 0.81 | 19 | 0.76 | 0.81 | 20 |

Iodine Value 48-51.
Free fatty acid (oleic) not more than 0.05 weight percent.
Shortening 3 MDP: 40 to 60 degrees Celsius (104 to 115 degrees Fahrenheit).
SFC from about 49 to 57 percent at 10 degrees C., from about 29 to 37 percent at 20 degrees C., from about 11 to 19 percent at 30 degrees C., from about 5 to 10 percent at 40 degrees C.
Free fatty acid (oleic) not more than 0.05 weight percent.

Samples of each of the Shortenings 1, 2, and 3 were combined with two different crystal-enhancing fat ingredients: Crystal-Enhancing Fat Ingredient 1, and Crystal-Enhancing Fat Ingredient 2:
Crystal-Enhancing Fat Ingredient 1 (#1)
This is a commercially available fully-hydrogenated soybean oil flake product.
MDP 65.0 to 70.0 (Celsius)
I.V. 5 (maximum)
Free fatty acids (0.10 percent) (maximum)
Crystal-Enhancing Fat Ingredient 2 (#2)
This is a commercially available blend of partially-hydrogenated cottonseed and soybean oil, and fully-hydrogenated cottonseed and soybean oil.
MDP 130 (Fahrenheit)
Free fatty acids (0.10 percent) (maximum).

Samples 1 through 9 were prepared from Shortenings 1, 2, and 3, Crystal-Enhancing Fat Ingredient 1 and Crystal-Enhancing Fat Ingredient 2, as follows.

Viscosity Viscosity is a measure of the degree of thickness or spreadability of the frosting. Viscosity relates directly to how the frosting functions when a consumer uses the frosting, such as by applying the frosting to a cake. As specified herein viscosity is measured at 70 degrees Fahrenheit, using a Brookfield DV-I viscometer and the following steps.

1. Place frosting sample (70 degrees F.) in a cup.
2. Lower the clean and dry spindle (F-T-Bart) until it is just above the surface of the frosting. (For cooked frosting, use the F-C-Bar.)
3. Turn on the viscometer motor. With the spindle rotating (@20 RPM) make sure the L.E.D. display reads "00.0."
4. Turn on the Helipath motor to being the downward movement of the spindle.
5. As soon as the cross bar breaks the surface of the frosting, count 6 revolutions and note the reading on the L.E.D. display (to the nearest 0.5).

Desired viscosities (expressed in units of percent torque) of a low density frosting as described herein can be in a range from 18 to 30, e.g., from 18 to 25, or from 18 to 22 percent torque (wherein percent torque×5000=viscosity in centipoise).

Stability as Measured by Stir-Down Test

The Stir-Down Test measures stability of a frosting by comparing a density measurement of a frosting sample to a density of the same frosting after the frosting has been stirred in a manner that has the potential to substantially increase the density of the frosting. An increased density of the frosting is an indication of instability of the low density frosting.

Apparatus:

Density cup—a 222-223 cubic centimeter (cc), 90 gram cup, 4.2 cm. high, undented.

Metal spatula—a stainless steel blade approximately 8 inches in length and 1¼ to 1½ inches wide.

Scale—an accurate scale measuring in grams.

Procedure: Collect 2 samples (340 grams each) of a frosting for testing: One "line sample" from preparation of the frosting, and one sample (from the same source) to be set aside as a "24 hour sample" to be tested after being held for 24 hours at 70 F.

Line Sample Test

Fill the clean, dry, room temperature cup slightly over the brim with frosting (70 F) from the line sample, soon after taking the sample from preparation.

Tap the cup firmly on the bench to eliminate air pockets.

Remove excess frosting by passing the spatula's smooth, flat edge across the surface of the cup at about a 45 degree angle starting from the middle of the cup, scrape both halves off.

Zero the scale and place the filled cup on the scale; record the combined weight of the cup and frosting.

Determine the density of the frosting based on the known volume of the cup and the measured weight of the frosting sample, less the 90 gram weight of the cup.

Record the value as frosting density.

Return the frosting sample to the tub; stir the sample 10 times; scrape the perimeter of the tub; stir 10 more times, scrape again, stir 10 more times for a total of 30 stirs before filling the density cup again. Weigh the cup and determine the density of the stirred frosting based on the known volume of the cup and the measured weight of the cup and frosting sample, less the 90 gram weight of the cup. This is the stir-down density.

A stir-down density result of less than 0.94 glee, preferably less than 0.90 g/cc, is preferred. A Stir-Down Density that is above 0.94 glee is considered to fail the test. Preferred stir-down density values can be below 90 g/cc, e.g., preferably from about 0.72 to about 0.88, e.g., from about 0.76 to about 0.82 glee.

24 Hour Sample Test

After holding the 24 hour sample for 24 hours at 70 F, test the frosting according to the same steps listed above. A stir-down density result (of the 24 h sample) of less than 0.94 glee, preferably less than 0.90 glee, is preferred. Above these 0.94 glee is considered to fail the test. Preferred stir-down density values can be below 90 glee, e.g., preferably from about 0.72 to about 0.88, e.g., from about 0.76 to about 0.82 glee.

Rate of Crystallization of Samples 1 Through 9

The Rate of Crystallization (ROC) of each fat samples 1 through 9 was measured by shock-cooling a sample of each melted fat while measuring the percent solids with time progression. Rate of crystallization of a fat is a measure of the changing amount of crystallized solids contained in a fat sample, over a period of time at which the temperature of the sample is reduced under controlled conditions. Rate of crystallization can be measured using standard Nuclear Magnetic Resonance (NMR) testing equipment and methods, such as the minispec mp 20 NMR by Bruker.

1. The NMR instrument must be powered on, calibrated, and warmed up and operational.

2. Melt a solid sample of fat (sufficient for step 3) using a microwave oven or stove top.

3. Pipette from melted fat sample into 20 individual 180 millimeter (mm)×10 mm glass NMR tubes (fill glass tube to an effective level, such as to a height of 40 millimeter).

4. Place these 20 tubes containing the melted fat into a 60 C water bath to temper for approximately 15 minutes.

5. After tempering to 60 C for 15 minutes, move glass tubes in sets of four each into individual tempering baths that are set to the following conditions:

a. 4 tubes (all at one time) to 0 degrees C. Start timer. Continue to add tubes to 0 degree water bath.
   b. 4 tubes (all at one time) to 0 degrees C.
   c. 4 tubes (all at one time) to 0 degrees C.
   d. 4 tubes (all at one time) to 0 degrees C.
   e. 4 tubes (all at one time) to 0 degrees C. All 20 tubes are in the bath before the timer reaches 30 seconds.

6. When timer count is at 30 seconds, remove the first tube from bath and place in the NMR instrument and take reading, which measures percent solid of the sample. It takes 10 to 15 seconds for the NMR to register a reading.

7. When the timer count is at 60 seconds, take the next tube from the 0 degree C. bath and place in the NMR instrument and obtain the second data point (percent solids of the sample).

8. The subsequent time intervals at which to pull samples from the 0 degree C. bath and place in the NMR follow the pattern outlined here:

| | | 1' 30" | 2' 00" |
|---|---|---|---|
| 2' 35" | 3' 05" | 3' 35" | 4' 05" |
| 4' 40" | 5' 10" | 5' 40" | 6' 10" |
| 6' 45" | 7' 15" | 7' 45" | 8' 15" |
| 8' 50" | 9' 20" | 9' 50" | 10' 20" |

9. Record percent solids reading of all 20 samples, and plot the percent solids versus seconds to obtain the Rate of Crystallization profile.

Figure 2:
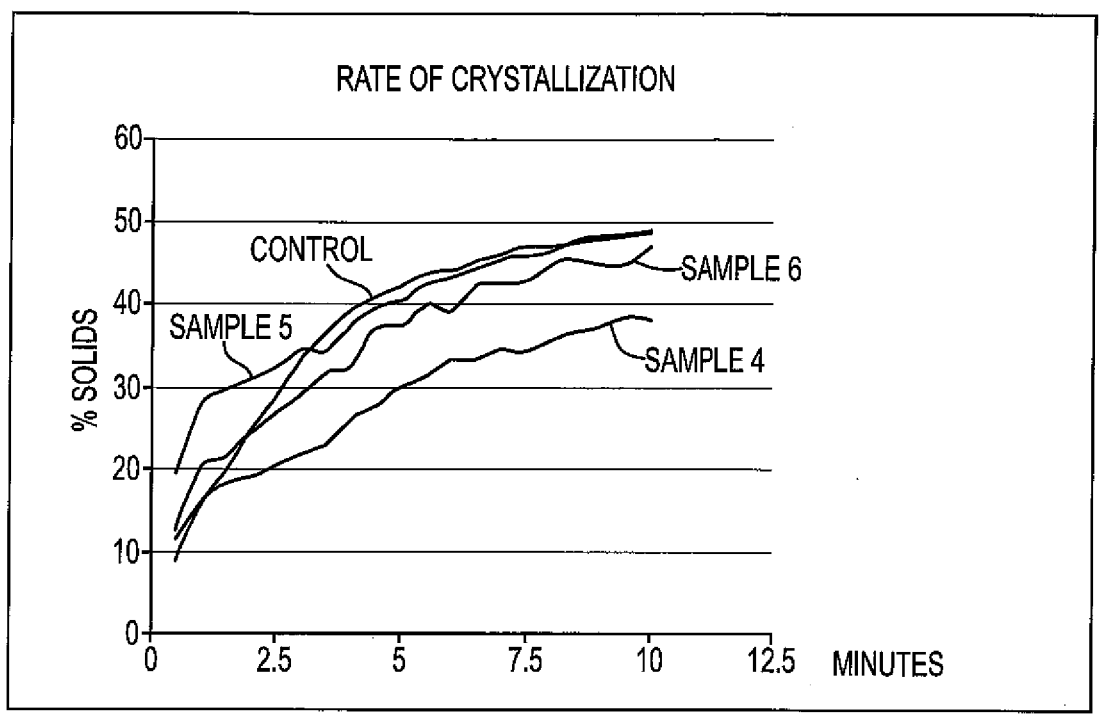
Figure 3:
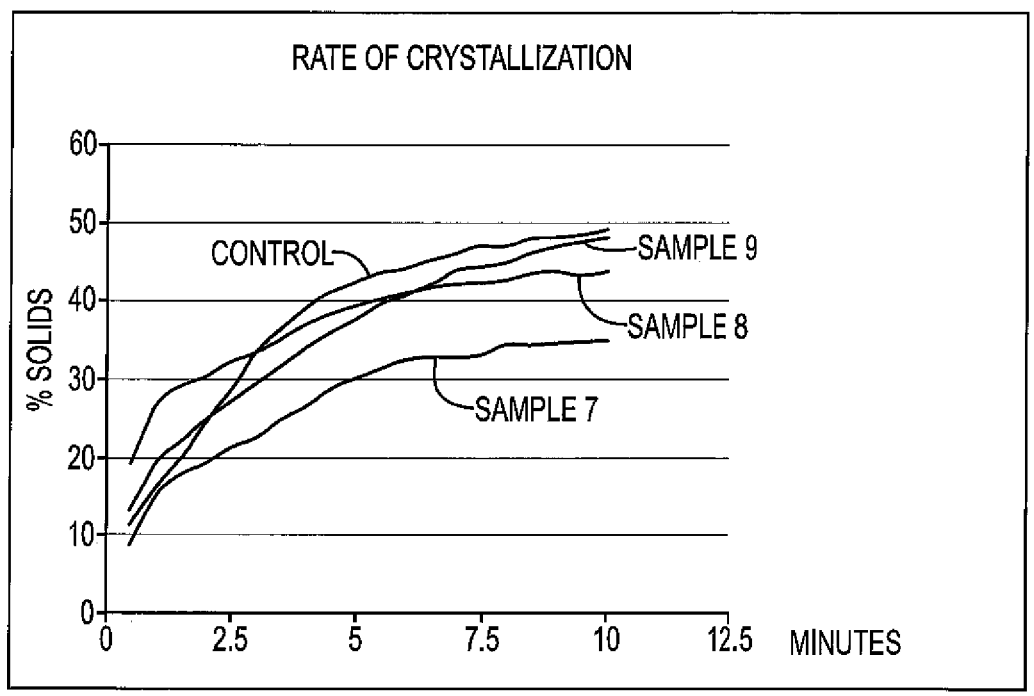
Figure 4:
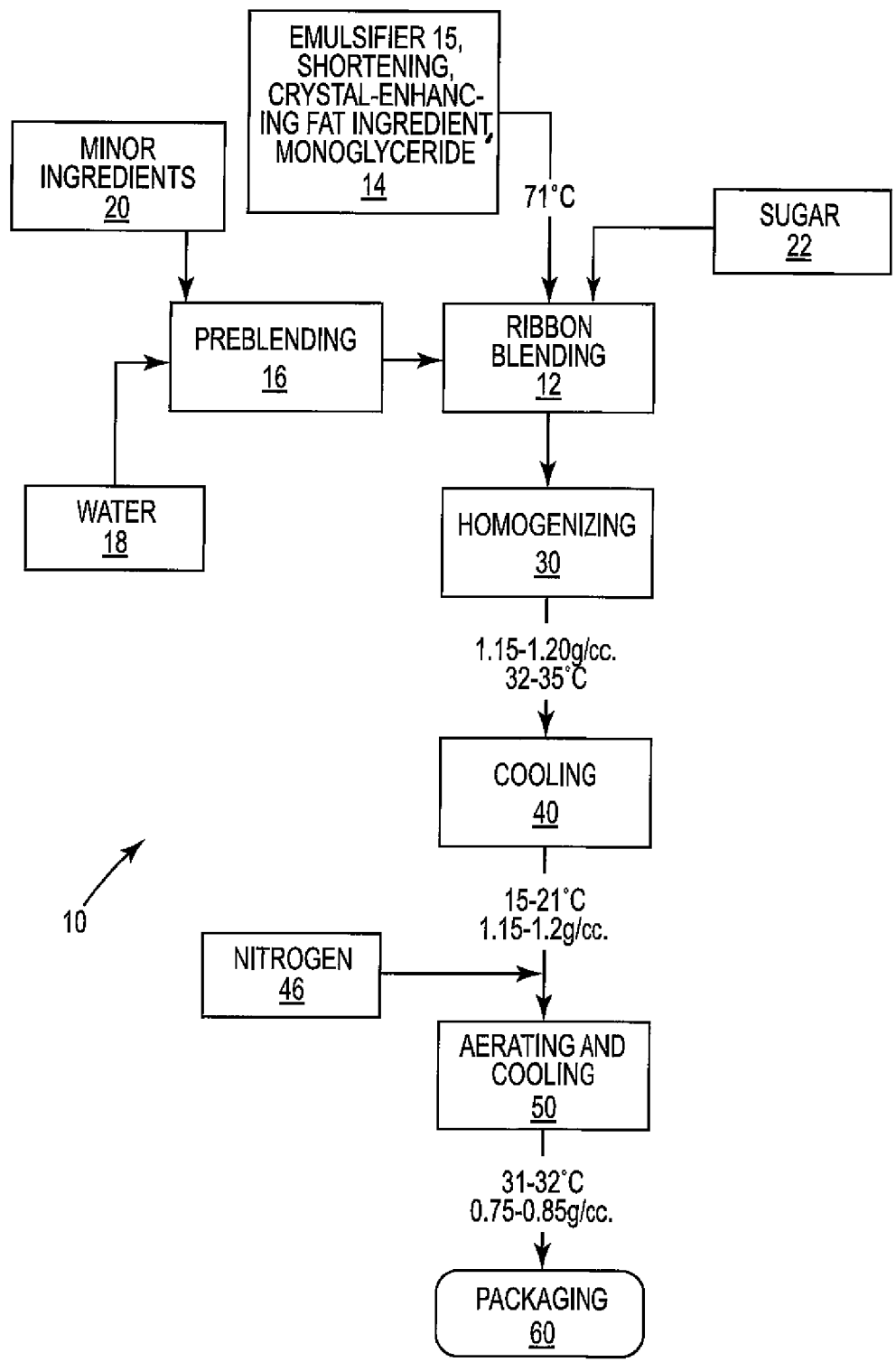
FIG. 4 shows a schematic of a process as described.

ROC profiles for samples 1, 2, 3, 4, 5, 6, 7, 8, and 9, are shown at FIGS. 1, 2, and 3. These figures also show ROC of a Control fat of 100 percent of a partially-hydrogenated blend of soybean oil (85 to 90 weight percent) and cottonseed oil (10 to 15 weight percent); an IV value of from 65 to 75; MDP of from 105 F to 120 F (preferred about 110 F); a trans fat content of from 25 to 35 weight percent, and containing no amount of crystal-enhancing fat ingredient as described. The SFC profile of the control includes the following solid fat content readings: @50 Deg F: 51-59; @70 Deg F: 30-38; @80 Deg F: 22-28; @92 Deg F: 13-18; @104 Deg F: 6-11).

Samples 1 through 9 were tested for SFC (at temperatures of 10 C, 21.1 C, 26.7 C, 33.3 C, and 40 C) and MDP, with results in the following table.

| Sample | 10 (C.) | 21.1 (C.) | 26.7 (C.) | 33.3 (C.) | 40 (C.) | MDP |
|---|---|---|---|---|---|---|
| 1 | 51.5 | 19.8 | 10.6 | 5.2 | 2.1 | 38.5 |
| 3 | 59.6 | 32.0 | 19.5 | 10.0 | 2.5 | 41.7 |
| 2 | 62.3 | 41.4 | 30.9 | 21.3 | 13.7 | 49.2 |
| 4 | 56.5 | 28.9 | 18.3 | 11.2 | 6.4 | 46.3 |
| 6 | 64.2 | 38.4 | 25.7 | 14.8 | 5.8 | 43.6 |
| 5 | 65.8 | 45.8 | 35.6 | 25.2 | 16.8 | 49.8 |
| 7 | 51.9 | 28.0 | 18.4 | 10.2 | 4.2 | 42.1 |
| 9 | 60.4 | 37.2 | 26.2 | 14.8 | 5.4 | 44 |
| 8 | 63.2 | 43.9 | 35.4 | 25.6 | 16.7 | 50.3 |

The invention claimed is:

1. A low density aerated frosting comprising:
from 50 to 85 weight percent sweetening agent based on total weight frosting;
from 15 to 30 weight percent total fat ingredients based on total weight frosting, the total fat ingredients exhibiting a rate of crystallization profile having a percent solid fat measurement of 22 to 35 percent at 2.5 minutes, 32 to 50 percent at 5 minutes, 39 to 52 percent at 7.5 minutes, and 39 to 55 percent at 10 minutes, and comprising:
at least 50 weight percent non-hydrogenated palm oil-based shortening ingredient, and
from about 7 to about 25 weight percent non-partially-hydrogenated crystal-enhancing fat ingredient, based on weight total fat ingredients; and
from 10 to 20 weight percent water based on total weight frosting;
wherein the aerated frosting has a density in a range from 0.75 to 0.90 grams per cubic centimeter.

2. A frosting of claim 1 wherein the non-hydrogenated palm oil-based shortening ingredient has a solid fat content profile that falls within the following ranges of percent solid fat: from about 47 to 63 percent at 10 degrees C., from about 20 to 40 percent at 20 degrees C., from about 4 to 21 percent at 30 degrees C., up to about 12 percent at 40 degrees C.

3. A frosting of claim 1 wherein the non-hydrogenated palm oil-based shortening ingredient exhibits a Mettler Drop Point that ranges from about 90 degrees F. to about 130 degrees F.

4. A frosting of claim 1 wherein the total fat ingredients include at least 90 weight percent of a blend of the non-hydrogenated palm oil-based shortening ingredient and the crystal-enhancing fat ingredient, based on the weight of the total fat ingredients.

5. A frosting of claim 1 wherein the crystal-enhancing fat ingredient has a solid fat content profile of that falls within the following ranges of percent solid fat: from about 75 to about 100 percent at 10 degrees C., from about 65 to about 90 percent at 20 degrees C., from about 30 to about 55 percent at 30 degrees C., from about 0 to about 20 percent at 40 degrees C.

6. A frosting of claim 1 wherein the crystal-enhancing fat ingredient has a Mettler Drop Point in a range from about 100 degrees F. to 150 degrees F.

7. A frosting of claim 1 wherein
the non-hydrogenated palm oil-based shortening ingredient contains at least 90 weight percent whole palm oil, palm stearin, interesterified palm oil, or a combination thereof, and
the crystal-enhancing fat ingredient contains at least 90 weight percent room temperature solid fully-hydrogenated fat, room temperature solid fractionated fat, room temperature solid interesterified fat, or a combination thereof.

8. A frosting of claim 1 wherein the crystal-enhancing fat ingredient is selected from fully-hydrogenated soy oil, fully-hydrogenated cottonseed oil, and combinations thereof.

9. A frosting of claim 1 wherein the total fat ingredients exhibit a Mettler Drop Point of 100 degrees F. to 131 degrees F.

10. A frosting of claim 1 wherein the total fat ingredients exhibit a solid fat content profile that falls within the following ranges of percent solid fat: from about 55 to about 70 percent at 50 degrees F., from about 25 to about 55 percent at 70 degrees F., from about 18 to about 40 percent at 80 degrees F., from about 8 to about 30 percent at 90 degrees F., and from about 0 to about 20 percent at 100 degrees F.

11. A frosting of claim 1 wherein the total fat ingredients exhibit a rate of crystallization profile that falls within the following range of percent solid fat:
at least 23 percent at 2.5 minutes.

12. A frosting of claim 1 wherein the frosting exhibits a Stir-Down Density of less than 0.94 grams per cubic centimeter.

13. A frosting of claim 1 wherein the frosting exhibits a Stir-Down Density in a range from about 0.75 to about 0.90 grams per cubic centimeter.

14. A frosting of claim 1 wherein the frosting exhibits a viscosity at 70 degrees F., using a Brookfield DV-I viscometer at 20 revolutions per minute in a range from 18 to 30 (percent torque).

15. A frosting of claim 1 wherein the crystal-enhancing fat ingredient is a room temperature solid fully-hydrogenated fat.

16. A frosting of claim 1 wherein the crystal-enhancing fat ingredient is a room temperature solid fractionated fat.

17. A frosting of claim 1 wherein the crystal-enhancing fat ingredient is a room temperature solid interesterified fat.

18. A frosting of claim 1 wherein the crystal-enhancing fat ingredient is a fractionated palm oil or fully hydrogenated palm oil fat.

19. A frosting of claim 1 wherein the total fat ingredients comprise at least 50 weight percent interesterified palm oil as the non-hydrogenated palm oil-based shortening ingredient.

20. A frosting of claim 1 wherein the total fat ingredients comprise at least about 67 weight percent non-hydrogenated palm oil-based shortening ingredient.

21. A frosting of claim 1 wherein the total fat ingredients comprise at least about 75 weight percent non-hydrogenated palm oil-based shortening ingredient.

22. A frosting of claim 1 wherein the total fat ingredients comprise at least about 80 weight percent non-hydrogenated palm oil-based shortening ingredient.

23. A frosting of claim 1, wherein the total fats ingredients comprise 7 to 20 weight percent non-partially-hydrogenated crystal-enhancing fat ingredient, based on weight total fat ingredients.

24. A low density aerated frosting comprising:
from 50 to 85 weight percent sweetening agent based on total weight frosting;
from 15 to 30 weight percent total fat ingredients based on total weight frosting, the total fat ingredients exhibiting a rate of crystallization profile having a percent solid fat measurement of at least 23 percent at 2.5 minutes, 32 to 50 percent at 5 minutes, 39 to 52 percent at 7.5 minutes, and 39 to 55 percent at 10 minutes, and comprising:
at least 50 weight percent non-hydrogenated palm oil-based shortening ingredient, and
from 7 to 25 weight fully hydrogenated fat, based on weight total fat ingredients; and
from 10 to 20 weight percent water based on total weight frosting;
wherein the aerated frosting has a density in a range from 0.75 to 0.90 grams per cubic centimeter and exhibits a Stir-Down Density of less than 0.94 grams per cubic centimeter at 14 days after preparation.

* * * * *